(12) United States Patent
Potter et al.

(10) Patent No.: US 6,308,230 B1
(45) Date of Patent: Oct. 23, 2001

(54) INFORMATION/SOFTWARE INTERFACE HAVING SERIAL COMMUNICATIONS DETECTION LOGIC/ELECTRONICS FOR DETERMINING EITHER A HOST OR AN EMBEDDED MICROCOMPUTER DEVICE CONTROLLER CONNECTED THERETO

(75) Inventors: Lynn A. Potter, North Kingstown, RI (US); C. Ray Dutton, New Bedford; Joseph B. Lopes, Seekonk, both of MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/228,079

(22) Filed: Dec. 28, 1998

(51) Int. Cl.[7] .................................................... G06F 13/10
(52) U.S. Cl. ........................ 710/64; 710/129; 709/203; 717/11

(58) Field of Search .......................... 710/62–64, 72–74, 710/129; 709/102, 200, 203, 208, 213, 238; 700/9, 11, 17, 20; 370/351; 717/11

(56) References Cited

U.S. PATENT DOCUMENTS

| | | | |
|---|---|---|---|
| 5,524,113 | * | 6/1996 | Gaddis ................................. 370/60.1 |
| 6,088,621 | * | 7/2000 | Woytowitz et al. .................... 700/16 |
| 6,119,197 | * | 9/2000 | Klein ........................................ 711/2 |

* cited by examiner

*Primary Examiner*—Thomas Lee
*Assistant Examiner*—Thuan Du
(74) *Attorney, Agent, or Firm*—Michael J. McGowan; Robert W. Gauthier; Prithvi C. Lall

(57) ABSTRACT

An improved communication interface for an embedded microcomputer device controller is provided. The interface includes serial communications detection logic/electronics for identifying the nature of external elements connected to the interface, and multiplex logic/electronics for programming and/or reprogramming the embedded microcomputer device controller in response to input signals received from a host device having a serial interface.

8 Claims, 2 Drawing Sheets

INFORMATION/SOFTWARE INTERFACE HAVING SERIAL COMMUNICATIONS DETECTION LOGIC/ELECTRONICS FOR DETERMINING EITHER A HOST OR AN EMBEDDED MICROCOMPUTER DEVICE CONTROLLER CONNECTED THERETO

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The invention relates generally to information/software interfaces for embedded microcomputer device controllers. More particularly, the invention relates to interfaces useful in programming, reprogramming and supplying new and/or updated information to embedded microcomputer device controllers.

(2) Description of the Prior Art

The use of embedded microcomputers as device controllers is well known in the art. Similarly, it is well known to provide a communication interface between embedded microcomputer device controllers and selected external elements. For example, the existing ADC MK3 and ADC MK4 six inch naval countermeasure devices each include an embedded microcomputer device controller and an interface for connecting the controller to an external Launch Control Panel or the like.

The capability for, nature of and level of communication provided between an embedded microcomputer device controller and external elements, however, has heretofore been quite limited. More particularly, returning to the naval countermeasure example (which will be adopted throughout this specification for purposes of illustration, but not limitation), the locations from which communication with the countermeasure are possible are limited to the ship or submarine of which the Launch Control Panel forms a part, or to those locations where a suitable launch control panel simulator or appropriate test box is present. Further, the countermeasures are limited to communicating the "go/no-go" status of their various systems and subsystems to the Launch Control Panel, and the Launch Control Panel can communicate only a very limited set of preset data to the countermeasure (e.g., "launch/don't launch" commands, clock time, ship position, etc.).

Still further, most embedded microcomputer device controllers are preprogrammed at the factory, and the software and/or information so preprogrammed is not readily replaceable or modifiable. Instead, in order to reprogram and/or update the memory or operating program of an embedded microcomputer device controller, it is necessary to extract the programmable memory elements from the device. This normally involves either the return of the device to the factory, or its delivery to a highly skilled technician who has access to specialized tools.

Such limited re-programmability is totally unsatisfactory in many applications. It is time-consuming, expensive, inconvenient, and in some cases, potentially dangerous. For example, the inability to easily reprogram or modify memory data and/or software in an embedded microcomputer device controller located within a medical testing apparatus could result in the inability of a physician to obtain accurate medical test result data in a timely manner. Appropriate diagnosis and/or treatment of a patient might thereby be adversely effected or delayed. Similarly, the inability to provide the aforementioned naval countermeasures with the most recent tactical software code, tactical information and/or threat information in a timely manner prior to the prescheduled departure time of the ship or submarine carrying the countermeasure could adversely impact upon the effectiveness of the countermeasure, and hence, the safety of those aboard the ship or submarine.

SUMMARY OF THE INVENTION

It is, therefore, an object of the present invention to redesign the core electronics (microcomputer) used as an embedded device controller so as to incorporate a modular architecture that can be upgraded easily with additional processing power and interfaces, and that is in-system re-programmable.

It also is an object of the invention to provide an improved interface for use with an embedded microcomputer device controller which is adapted for connection,to either (1) external elements such as the Launch Control Panel mentioned above, or (2) a personal computer, laptop computer or other host device having a serial interface for re-programming, programming, or otherwise modifying the preprogramming of, and/or information stored in, the embedded microcomputer control device.

Further, it is an object of the invention to provide an improved interface for use with an embedded microcomputer device controller which will automatically determine the nature of an external element or elements connected thereto, and direct the incoming signal therefrom so as to either (1) update the preprogramming of the device or (2) operate the device according to its preprogrammed instructions.

With the above and other objects in view, as will hereinafter more fully appear, a feature of the invention is the provision of an improved communication interface for an embedded microcomputer device controller. The interface generally comprises serial communications detection logic/electronics for identifying the nature of elements connected to the interface, and multiplex logic/electronics for programming and/or reprogramming the embedded microcomputer in response to input signals received from a host device containing downloadable information and/or software, and which has a serial interface.

In a preferred embodiment, the invention adopts known PC104 technology as a substitute for the customized chip-by-chip architecture design found in older embedded microcomputer device controllers. More specifically, the microcomputer comprises three PC104 boards disposed in electrically interconnected relation with one another. These boards include a power module, a central processing unit and a sensor bus.

A customized PC104 board is also provided. This customized board serves as the communication interface with external elements such as the Launch Control Panel referred to above, and also, alternatively, as the interface with a host device such as a personal computer having a serial interface. To accomplish this, the customized board includes the serial communication detection logic/electronics and the multiplex logic/electronics mentioned above. In addition, this customized board is electrically interconnected with the other PC104 boards forming the microcomputer via connectors, a wiring harness and other hardware which correspond to the elements used to establish external element communication with older, customized, chip-by-chip circuit design architectures.

The serial communication detection logic/electronics determine whether external elements such as a Launch Control Panel, or the serial port from an external host computer or the like, is connected to the external interface connector. If a serial port is detected, the input from the external connector is routed to the PC104 central processor board using the multiplexer logic/electronics. At the central processor board, the signals from the multiplexer logic/electronics are identified as new download software and/or information, and are used to program and/or reprogram the central processor memory and/or to update the various memory fields which may be contained therein.

On the other hand, if external elements such as the Launch Control Panel mentioned above are detected, the external interface connector is routed to a field programmable gate array. This gate array controls the interface in accordance with the information and software then contained in its flash memory, and the device operates without modification.

It also is contemplated that the PC104 central processing unit will handle all required serial communications protocols, and that the PC104 power module will be driven by a DC to DC converter operating on inputs received either from the external element circuitry or the serial input from the external host device's serial output.

The above and other features of the invention, including various novel details of construction and combination of parts, will now be more particularly described with reference to the accompanying drawings and pointed out in the claims. It will be understood that the particular device shown embodying the invention is shown by way of illustration only, and not as a limitation of the invention. The principles and features of the invention may be employed in various and numerous embodiments without departing from the scope of the invention in its broadest aspects.

BRIEF DESCRIPTION OF THE DRAWINGS

Reference is made to the accompanying drawings in which is shown an illustrative embodiment of the invention, from which its novel features and advantages will be apparent, wherein like numerals indicate like parts throughout the several views of the drawings and wherein.

DESCRIPTION OF THE PREFERRED EMBODIMENT

As noted above, the present invention approaches the problem of replacing an embedded microcomputer device controller designed using a customized chip-by-chip architecture with an in-system re-programmable unit by the use of a modular device architecture which can be upgraded easily with additional processing power and interfaces. To accomplish this, PC104 technology is utilized. The benefits and advantages of embedding PC technology in limited space applications utilizing PC104 boards is well known in the art. Specifically, such boards offer full system architecture, hardware and software capabilities with the standard PC Bus, but in ultra compact (3.6"×3.6") modules. Further, these boards may be stacked, plugged into customized carrier boards or mounted in railed card cages as the system requirements dictate and the circuit designer desires. Still further, PC104 technology is low cost, low power and industry standardized. It also is designed for use under severe environmental and temperature conditions. In addition, the PC bus standard compatibility of this technology allows PC hardware, software and developmental tools and system design knowledge to be fully leveraged in its use. The reprogramming of one or more PC104 boards used as an embedded microcomputer device controller, however, still requires the extraction of its programmable memory from an embedded location within the device.

In at least some applications, the embedded microcomputer device controller may be connected for rudimentary communication with selected external elements via an external interface connector. As noted above, one example of such a system is the so-called ADC MK3 and ADC MK4 naval countermeasures (CM) wherein the embedded microcomputer device controller communicates with an external Launch Control Panel (LCP) via a Launch Control Panel Interface. For convenience of reference and understanding, the remainder of this specification will be rendered in terms of the CM system context. It is to be understood, however, that many changes in the details, materials, steps and arrangement of elements herein described and illustrated in order to explain the nature of the invention may be made by those skilled in the art without departure from the invention in its broadest aspects.

Figure 1:
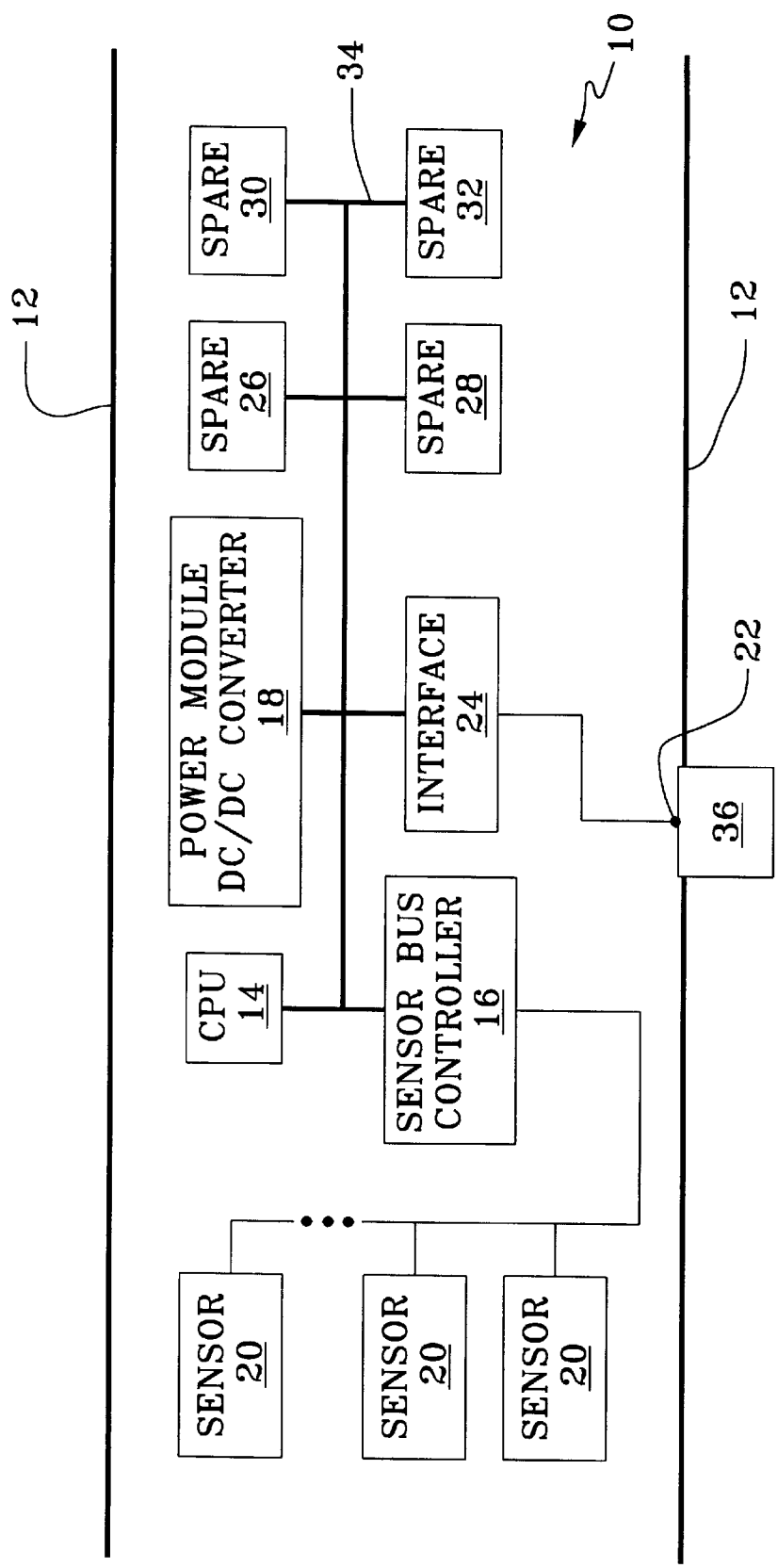
FIG. 1 is an illustrative block diagram showing the use of three (3) electrically interconnected PC104 boards as a embedded microcomputer device controller and a customized PC104 board as an improved interface in accordance with the invention in the context of a naval countermeasure.

Referring now to the drawings, and particularly to FIG. 1, a block diagram of a naval countermeasure control electronics system 10 is shown within a CM hull 12. In this system, the embedded microcomputer device controller is contained on three (3) PC104 boards 14, 16 and 18 which are electrically interconnected with one another and one or more selected external sensors representatively shown at 20. In this embodiment, the board 14 is a central processing unit, the board 16 is a sensor bus controller for receiving input signals from the sensors 20, and the board 18 is a power module including a DC to DC converter receiving power from a power subsystem of the CM (not shown). The system also includes an external interface connection 22 which is electrically interconnected to the embedded microcomputer device controller via an interface PC104 board 24.

In the design shown, the electronic layout of the countermeasure control electronics also includes spare locations 26, 28, 30 and 32 electrically interconnected with the common ISA BUS 34 for future system upgrade and/or expansion. Further, the external interface connection 22 is adapted to be connected either to external elements such as a Launch Control Panel, or alternatively, to the serial output of a PC host device, as representatively shown at 36.

Figure 2:
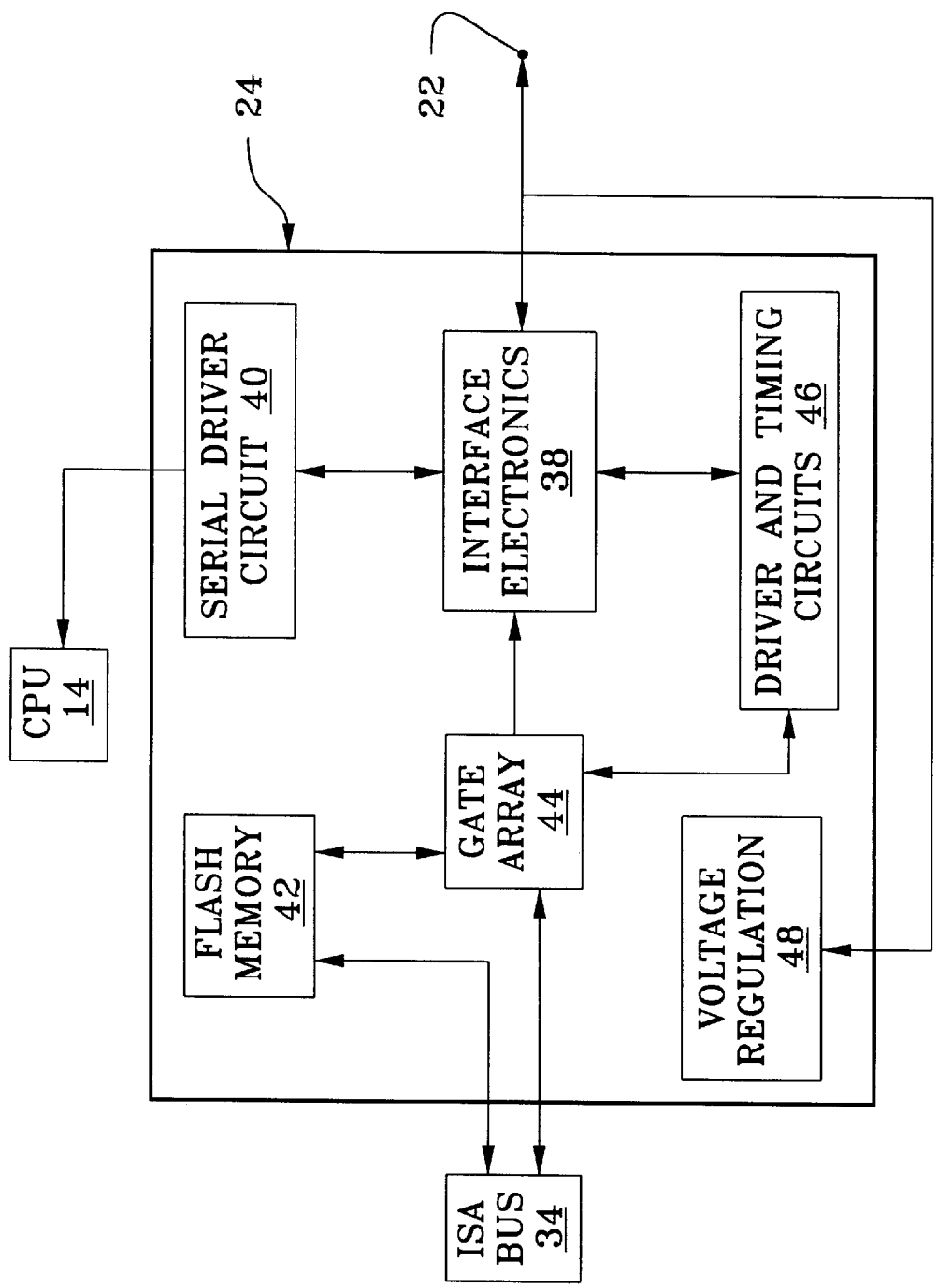
FIG. 2 is an illustrative block diagram showing the various components and logic of the PC104 board depicted in FIG. 1.

An illustrative block diagram of the customized interface PC104 board 24 in accordance with the invention is shown in FIG. 2. This board is also electrically interconnected to the common ISA BUS 34, the central processor board 14, and the external interface connector 22. In addition, it comprises interface electronics representatively shown at 38, serial driver circuitry representatively shown at 40, flash memory representatively shown at 42, a field programmable control gate array representatively shown at 44 for controlling the Launch Control Panel interface, launch control panel driver and timing circuitry 46 and voltage regualtion 48. More specifically, the serial communication detection and multiplexer electronics/logic 38 communicates with the external connector 22, and is electrically connected to the serial driver circuitry 40 and to the launch control panel driver and timing circuitry 46. The serial driver circuitry 40 is, in turn, electrically connected to the central processing unit 14. The launch control panel driver and timing circuitry 46 and the flash memory 42 also are electrically connected to the programmable field control gate array 44.

It is contemplated that the external connector 22 may comprise a single connector element, or may comprise a pair of separate connectors connected in parallel relation to one another to the electronics 38. In either event, interface electronics 38 serves as a normally closed switch between connector 22 and circuitry 46. When an external connection is made at connector 22, the serial communication detection logic within gate array 44 determines whether or not a serial port is connected to the connector 22. If it is, gate array 44 controls interface electronics 38 to drive the serial driver circuitry 40 so as to direct downloaded information and/or software received from an external host device 36 (shown in FIG. 1) having a serial interface to the central processor unit 14 for reprogramming of its memory. Similarly, the downloaded software and/or memory information is routed from central processor unit 14 to the flash memory 42 via the ISA BUS 34 and the field programmable gate array 44. On the other hand, if the serial communication detection logic detects the Launch Control Panel (also representatively shown at 36 in FIG. 1) and no serial port input, interface electronics 38 routes the interface input to the launch control panel driver and timing circuitry 46 which in turn controls the interface in accordance with its preprogrammed specifications located in flash memory 42 via field programmable gate array 44.

More specifically, the flash memory 42 is adapted to contain and play back the preprogrammed data originally loaded, or such updates thereof as have been supplied to it, via the field programmable gate array 44. The system is also contemplated to be capable of storing and driving the timing control sequences of the naval countermeasure launcher system (not shown), if desired.

Finally, it is to be understood that in the present invention it is contemplated that voltage regulation 48 will convert power received via the external connector 22 down to the appropriate levels to drive the low power PC104 circuit board used to form the interface 24. Also, it will be understood that the central processing unit 14 will be programmed (1) to handle all serial communications protocols which may be required among the various circuitry and the external host serial device, (2) to identify any downloaded data or software received from the external serial host device, and (3) to reprogram the appropriate flash memory and/or modify such internal parameter data fields as may be necessary in view of the information download.

It, therefore, will be seen that the invention provides a number of advantages. It removes the necessity for confidential or classified software preloading at the factory, thereby significantly improving the security of the embedded software code. It removes the necessity of extracting the programmable memory of the embedded microcomputer device controller from the device hardware in order to load software fixes, corrections and/or new information. Additionally, it provides the capability of reprogramming and/or updating the information preprogrammed into an embedded microcomputer device controller in a time sensitive manner without special tools or the chance of damage to sensitive parts.

The last of these advantages is believed to be particularly important because the device may now be reprogrammed at substantially any location in a timely manner without the need for specially trained and highly skilled personnel. Thus, for example, a naval countermeasure may now be reprogrammed and/or updated by an individual with a personal computer, or even a laptop computer, at dockside immediately prior to countermeasure load out and ship departure.

It further will be understood that the foregoing description of a preferred embodiment of the invention has been presented by way of illustration only, and not limitation. Numerous changes, modifications, variations, alterations and the like will occur to those in the art in view of the foregoing specification and description. The scope of the invention is, therefore, to be limited only by the terms of the appended claims.

What is claimed is:

1. An interface for a naval countermeasure system including a launch control panel, a naval countermeasure having an embedded microcomputer device controller with a central processing unit and programmable memory, comprising:

electrical connection means for connecting the interface to the naval countermeasure;

flash memory;

a connector for allowing alternative communication via said electrical connection means between said microcomputer device controller and said launch control panel, and between said microcomputer device controller and an external host device having a serial output;

serial communication detection logic/electronics for detecting and differentiating the connection of one of said launch control panel and said external host to said connector;

multiplexer logic/electronics for routing input signals from said connector to said central processing unit for programming said programmable memory and said flash memory when said external host device is detected at said connector; and a programmable gate array and related driver circuitry for controlling said countermeasure according to the programming of said flash memory when said launch control panel is detected at said connector.

2. An interface according to claim 1 further comprising a power controller for powering said interface from input power received at said connector.

3. An interface according to claim 2 wherein said power controller comprises a DC voltage regulation.

4. An interface for electrically and alternatively connecting an embedded microcomputer controller of a countermeasure to an external host device and to a countermeasure Launch Control Panel, the interface comprising:

a field programmable gate array for detecting and differentiating the connection of said external host and said Launch Control Panel to said interface;

a serial driver circuit activated when the field programmable gate array detects the external host device is connected to the interface;

a launch control driver and timing circuit activated when the field programmable gate array detects the Launch Control Panel is connected to the interface; and routing electronics controlled by the field programmable gate array to selectively activate the serial driver circuit and the launch control driver and timing circuit.

5. An interface according to claim 4 wherein said Launch Control Panel comprises monitoring and control circuitry adapted for limited preselected communication to and from said embedded microcomputer controller, the controller driving timing control sequences of a countermeasure launcher system through said Launch Control Panel.

6. An interface according to claim 4 wherein said interface comprises at least one PC104 circuit board electrically interconnected with said microcomputer.

7. The interface of claim 4 further comprising:

a voltage regulator connected to a power source within the embedded microcomputer controller; and a flash memory for storing and communicating data and commands between the Launch Control Panel and the countermeasure.

8. The interface of claim 7 further comprising:
a first connection between the serial driver circuit and a central processing unit of the embedded microcomputer controller;
a second connection between the flash memory and an ISA Bus of the embedded microcomputer controller; and
a third connection between the field programmable gate array and the ISA Bus, the first, second and third connections allowing information and software downloads from the external host, through the interface, to the central processing unit and across the ISA Bus to be stored in the flash memory.

* * * * *